(12) United States Patent
Rao

(10) Patent No.: US 11,924,187 B2
(45) Date of Patent: *Mar. 5, 2024

(54) SYSTEMS AND METHODS FOR SECURELY MIGRATING DATA BETWEEN DEVICES

(71) Applicant: Wells Fargo Bank, N.A., San Francisco, CA (US)

(72) Inventor: Abhijit Rao, Irvine, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 175 days.

This patent is subject to a terminal disclaimer.

(21) Appl. No.: 17/194,890

(22) Filed: Mar. 8, 2021

(65) Prior Publication Data

US 2021/0194864 A1    Jun. 24, 2021

Related U.S. Application Data

(63) Continuation of application No. 16/384,196, filed on Apr. 15, 2019, now Pat. No. 10,972,450.

(51) Int. Cl.
*H04L 9/40* (2022.01)
*H04L 65/1069* (2022.01)
*H04L 65/403* (2022.01)

(52) U.S. Cl.
CPC .............. *H04L 63/08* (2013.01); *H04L 63/04* (2013.01); *H04L 63/126* (2013.01); *H04L 65/1069* (2013.01)

(58) Field of Classification Search
CPC ....... H04L 63/08; H04L 63/04; H04L 63/126; H04L 65/1069

(Continued)

(56) References Cited

U.S. PATENT DOCUMENTS

| | | |
|---|---|---|
| 6,598,134 B2 | 7/2003 | Ofek et al. |
| 7,454,465 B2 | 11/2008 | Manion et al. |

(Continued)

FOREIGN PATENT DOCUMENTS

| | | | | |
|---|---|---|---|---|
| DE | 102006025369 A1 * | 6/2007 | ....... | H04L 29/06027 |
| EP | 3082292 A1 | 10/2016 | | |

(Continued)

OTHER PUBLICATIONS

Patricia A H Williams; Always Connected: The Security Challenges of the Healthcare Internet of Things; IEEE:2016; pp. 30-36.*

(Continued)

*Primary Examiner* — Monjur Rahim
(74) *Attorney, Agent, or Firm* — K&L Gates LLP

(57) ABSTRACT

Methods, apparatuses, and computer program products are disclosed for securely migrating data between devices. An example method includes receiving a request at a first time for data migration between a first user device and a second user device each associated with a first user. The method further includes retrieving a baseline attribute dataset associated with the first user generated before the first time and generating a first attribute dataset associated with the first user. The method includes authenticating a session between the first user device and the second user device at the first time and causing data transfer between the first user device and the second user device. The method further includes generating a second attribute dataset associated with the first user at a second time after the first time and authenticating the session at the second time based on the first attribute dataset and the second attribute dataset.

20 Claims, 5 Drawing Sheets

(58) Field of Classification Search
USPC .......................................................... 726/5
See application file for complete search history.

(56) References Cited

U.S. PATENT DOCUMENTS

| | | | |
|---|---|---|---|
| 8,103,247 B2 | 1/2012 | Ananthanarayanan et al. | |
| 8,874,691 B2 | 10/2014 | Saridakis | |
| 8,902,045 B1* | 12/2014 | Linn | A61B 5/117 |
| | | | 340/5.82 |
| 9,119,539 B1 | 9/2015 | Dotan et al. | |
| 9,198,035 B2 | 11/2015 | Hansen et al. | |
| 9,641,240 B2 | 5/2017 | Dave et al. | |
| 9,717,107 B2 | 7/2017 | Rayanki et al. | |
| 10,148,631 B1* | 12/2018 | Sokolov | H04W 12/65 |
| 10,771,523 B1* | 9/2020 | Carney Landow | H04W 12/02 |
| 2004/0267937 A1* | 12/2004 | Klemets | H04L 9/40 |
| | | | 709/227 |
| 2011/0043602 A1 | 2/2011 | Lee | |
| 2012/0284122 A1 | 11/2012 | Brandis | |
| 2013/0073669 A1 | 3/2013 | Roberts et al. | |
| 2014/0338004 A1* | 11/2014 | Camiel | G06F 21/604 |
| | | | 726/30 |
| 2016/0071101 A1 | 3/2016 | Winarski | |
| 2016/0125490 A1* | 5/2016 | Angal | G06Q 30/0641 |
| | | | 705/26.35 |
| 2016/0255495 A1 | 9/2016 | Huang et al. | |
| 2016/0360412 A1 | 12/2016 | Wilson et al. | |
| 2016/0381000 A1* | 12/2016 | Mathew | H04L 63/0815 |
| | | | 726/4 |
| 2017/0078922 A1* | 3/2017 | Raleigh | H04L 69/18 |
| 2017/0093822 A1 | 3/2017 | Gutierrez et al. | |
| 2018/0124047 A1 | 5/2018 | Fisher et al. | |
| 2018/0181964 A1 | 6/2018 | Zagarese et al. | |
| 2020/0125700 A1* | 4/2020 | Chang | G06F 21/6218 |
| 2020/0137042 A1* | 4/2020 | Kannan, III | H04L 63/083 |
| 2020/0195785 A1* | 6/2020 | Meredith | H04M 15/60 |

FOREIGN PATENT DOCUMENTS

| | | |
|---|---|---|
| WO | 2006/057627 A1 | 6/2006 |
| WO | 2017/181923 A1 | 10/2017 |
| WO | 2018/176020 A1 | 9/2018 |

OTHER PUBLICATIONS

AT&T Mobile Transfer App—Transfer Phone Contacts & More [online], [retrieved Jul. 12, 2019], retrieved from the Internet, <https://www.att.com/features/mobile-transfer.html> (6 pages).

Hussain et al., Secure Seamless Bluetooth Low Energy Connection Migration for Unmodified IoT Devices, Aug. 16, 2017, [article, online], [retrieved Jul. 12, 2019], retrieved from the Internet, <https://ieeexplore.ieee.org/document/8011489> (12 pages).

IOS Security [online], [retrieved Jul. 12, 2019], retrieved from the Internet, <https://www.apple.com/business/docs/iOS_Security_Guide.pdf> (94 pages).

Plans & features T-Mobile Support [online], [retrieved Jul. 12, 2019], retrieved from the Internet, <https://support.t-mobile.com/community/plans-features> (5 pages).

Samsung Smart Switch Transfer Contacts, Music and More Samsung US [online], [retrieved Jul. 12, 2019], retrieved from the Internet, <https://www.samsung.com/us/smart-switch/> (11 pages).

Shi et al., DocFace: Matching ID Document Photos to Selfies, May 6, 2018, [article, online], [retrieved Jul. 12, 2019], retrieved from the Internet, <https://arxiv.org/pdf/1805.02283.pdf> (8 pages).

* cited by examiner

SYSTEMS AND METHODS FOR SECURELY MIGRATING DATA BETWEEN DEVICES

CROSS REFERENCE TO RELATED APPLICATIONS

The present application is a continuation application of U.S. patent application Ser. No. 16/384,196, filed Apr. 15, 2019, which is hereby incorporated by reference in its entirety.

TECHNOLOGICAL FIELD

Example embodiments of the present invention relate generally to data transfer between devices and, more particularly, to continuous authentication for data transfer.

BACKGROUND

Traditional security systems may authenticate a user or device only once and, thereafter, re-authenticate the user or device after the session is discontinued. While the session is active, the user and/or device may rely on the initial authentication to protect data transmitted during the session. Applicant has identified many deficiencies and problems associated with these existing security systems. Through applied effort, ingenuity, and innovation, many of these identified deficiencies and problems have been solved by developing solutions that are in accordance with the embodiments of the present disclosure, many examples of which are described in detail herein.

BRIEF SUMMARY

Conventional methods and systems for securing a session or other connection between devices often rely upon a single, initial authentication procedure. Traditionally, this security requires that a user input a password, provide a biometric input (e.g., eye scan, facial recognition, etc.), or the like at the time of session establishment. During the session, however, traditional systems often fail to ensure that the session remains secure or otherwise prevents unauthorized access. For example, a user's email address or account credentials may be known to an unauthorized party, or a user's device (e.g., mobile phone, tablet, etc.) may be stolen or otherwise compromised following the initial authentication procedure. Furthermore, emerging technologies that provide for local communication and data transfer between devices (e.g., between mobile phones) present an increased risk that data may be transferred to another device without authorization from the user. In this way, even in instances in which the user's credentials remain secure, devices in physical proximity to the user's device may attempt to compel unauthorized data transfer.

The technical challenge of securing digital content has traditionally be driven by the prior inability of systems to access multiple devices associated with the same user. Without ready access to multiple devices, users of traditional systems have not had access to practical tools for continuously authenticating a session during data transfer. Given the advancement of the sophistication of the various devices available to users today, such devices provide new tools for employing these strategies based upon a new and wider range of authentication and security mechanisms. The inventors have identified that the current increase in the number of user devices (e.g., smartphones, tablets, smart glasses, wearable technology, and the like) associated with a single user thus has created a new opportunity for solutions for securing data transfer which were historically unavailable.

To solve these issues and harness this new potential, example implementations of embodiments of the present invention may receive a video stream from one or more devices each associated with the same user during data transfer. These video streams may be used alone or in combination to confirm that identity of the user associated with these devices during data transfer. Example implementations described herein may compare the video steams with various thresholds and/or against baseline attributes associated with the user. In instances in which these thresholds are satisfied, the session may be continuously authenticated by the embodiments described herein. Conversely, in instances in which these thresholds are not satisfied, example embodiments may halt the transfer of data between devices. In doing so, such example implementations confront and solve at least two technical challenges: (1) they provide new methods for providing continuous security once a session is established, and (2) they ensure that data is transferred only between devices associated with the same user.

Systems, apparatuses, methods, and computer program products are disclosed herein for securely migrating data between devices. In one embodiment, with reference to the claimed method, a method for securely migrating data between devices of a user is provided. The method may include receiving a request at a first time for data migration between a first user device and a second user device each associated with a first user. The method may further include retrieving, by session authentication circuitry, a baseline attribute dataset associated with the first user generated before the first time and generating, by the session authentication circuitry, a first attribute dataset associated with the first user. The method may further include authenticating, by the session authentication circuitry, a session between the first user device and the second user device at the first time based on the baseline attribute dataset and the first attribute dataset. The method may include causing, by data migration circuitry, data transfer between the first user device and the second user device, and generating, by continuous authentication circuitry, a second attribute dataset associated with the first user at a second time after the first time. The method may also include authenticating, by the continuous authentication circuitry, the session at the second time based on the first attribute dataset and the second attribute dataset.

In some embodiments, generating the second attribute dataset may further include receiving, by video monitoring circuitry in communication with the continuous authentication circuitry, a video stream captured over a duration of time that begins after about the first time, wherein the video stream comprises a plurality of video frames. In such an embodiment, the method may include generating, by the video monitoring circuitry, a video dataset based on the video stream. Still further, the method may include generating, by the continuous authentication circuitry, the second attribute dataset based on the video dataset. In some embodiments, the video stream includes a face of the first user and/or is received from the first user device.

In other embodiments, generating the second attribute dataset includes receiving, by video monitoring circuitry in communication with the continuous authentication circuitry, a first video stream captured by the first user device over a duration of time that begins after about the first time, wherein the first video stream comprises a plurality of video frames. In such an embodiment, the method may also include receiving, by the video monitoring circuitry, a second video stream captured by the second device over the duration of time that begins after about the first time, wherein the second video stream comprises a plurality of video frames. In some instances, each of the first video stream and the second video stream include a face of the first user.

In some instances, the method includes comparing, by the video monitoring circuitry, the first video stream and the second video stream with a video consistency threshold. In an instance in which the first video stream and the second video stream satisfy the video consistency threshold, the method includes generating, by the video monitoring circuitry, the video dataset based on the first video stream and the second video stream. In an instance in which the first video stream and the second video stream fail to satisfy the video consistency threshold, the method includes halting, by the data migration circuitry, data transfer between the first user device and the second user device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the present disclosure.

DETAILED DESCRIPTION

Figure 1:
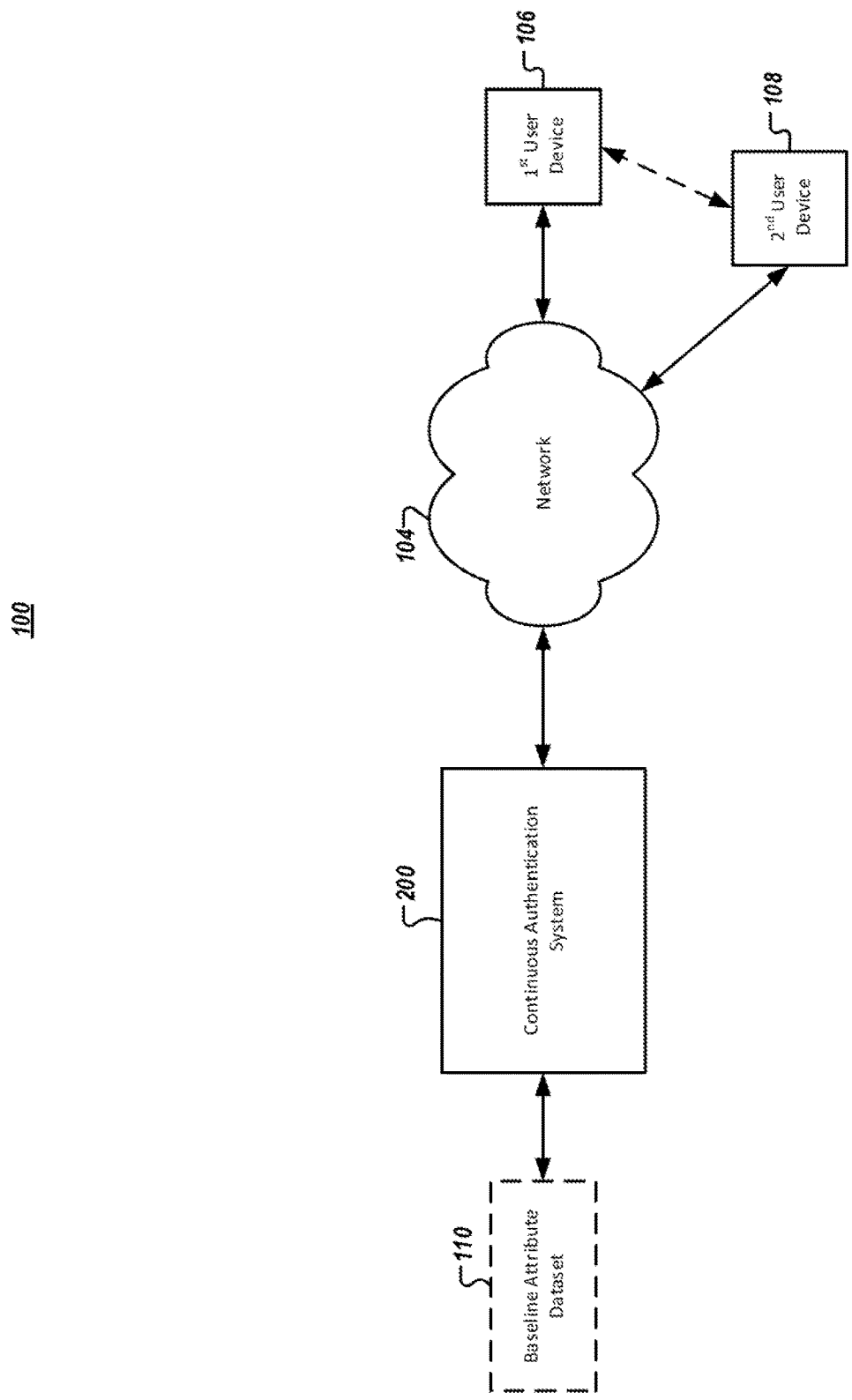
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an "apparatus" or continuous authentication server; however, elements of the apparatus described herein may be equally applicable to the claimed method and computer program product. Thus, use of any such terms should not be taken to limit the spirit and scope of embodiments of the present invention.

Overview

As noted above, methods, apparatuses, systems, and computer-program products are described herein that provide solutions to the problems identified above, as well as others. In some example embodiments, an apparatus (e.g., a continuous authentication server) is provided that may securely migrate data between user devices. As described below with reference to the flowcharts illustrated in FIGS. 3-5, an example apparatus (e.g., a continuous authentication server) may receive a request at a first time for data migration between a first user device and a second user device each associated with a first user. As described more fully hereinafter, a user may wish to transfer data (in whole or in part) between user devices each associated with the same user (e.g., a first user). For example, a user may upgrade his or her smart phone and may attempt to migrate data (e.g., pictures, biometric data, contacts, and/or the like) from his or her current phone (e.g., first user device) to his or her upgraded phone (e.g., second device). This request may, in some embodiments, be transmitted by the first user device or by the second user device. In other embodiments, this request may be made by an external device (e.g., external server, networking device, or the like) in communication with the first user device and/or the second user device (e.g., via a network or the like).

In some example embodiments, the continuous authentication server may retrieve a baseline attribute dataset associated with the first user generated before the first time. This baseline attribute dataset may correspond to user data (e.g., biometric data, sensor data, user passwords, credentials, or the like) gathered prior to the first time (e.g., prior to the request for data migration). The continuous authentication server may further generate a first attribute dataset associated with the first user at the first time. The first attribute dataset may correspond to user data (e.g., biometric data, sensor data, user passwords, credentials, or the like) gathered at the first time (e.g., at the time of the request) and may be gathered by one or more sensors, cameras, or the like of the first and/or the second user device. The continuous authentication server may authenticate a session between the first user device (e.g., current phone) and the second user device (e.g., upgraded phone) at the first time based on the baseline attribute dataset and the first attribute dataset. Said differently, the continuous authentication server may compare the user data gathered at the first time (e.g., the first attribute dataset) with the user data gathered prior to the first time (e.g., the baseline attribute dataset) in order to verify the identity of the user. The continuous authentication server may, in an instance in which the first attribute dataset and the baseline attribute dataset are sufficient to verify the identity of the user, authenticate the sessions between the user's devices.

Once a session is established, the embodiments described herein may cause data transfer between the first user device and the second user device. During the data transfer, the continuous authentication server may generate a second attribute dataset associated with the first user at a second time after the first time. As described more fully hereafter, the second attribute dataset may correspond to the iterative collection of user data and iterative comparison of this user data (e.g., second attribute dataset) with prior generated attribute datasets (e.g., a baseline attribute dataset, a first attribute dataset, etc.). In some embodiments, the continuous authentication server may provide for extracting various attribute data (e.g., biometric data, facial region data, facial region-by-region motion data, sensor data, and other suitable data), on a frame by frame basis, from video data during a prior session. In some embodiments, the continuous authentication server may further provide for deriving behavioral patterns from the extracted attribute data and, in some instances, captured sensor data to establish a baseline or reference points for use in authenticating a session. In some embodiments, the continuous session authentication system further may provide for, during the continuous authentication of a session, performing comparisons from newly-derived behavioral data (e.g., a second attribute dataset) to the previously-derived behavioral data acting as the baseline or reference points. In instances in which the newly-derived user data sufficiently confirms the identity of the user, the continuous authentication server may continue to authenticate the session between the first user device and the second user device.

In some embodiments, the principal source for biometric data is video data, such as selfie video data. The continuous authentication server may use this video data as a reference to store various sensor data, such as tilt data, acceleration data, and touch sensor data. For example, the continuous authentication server may use video data to derive biometric facial data such as landmark or nodal point data in the video stream. In another example, the continuous authentication server may overlay region information (e.g., biometric facial data) with the sensor data to generate behavioral attribute data. In yet another example, the continuous authentication server may store sensor data in relation to video frames, extract biometric information from the video frames, and overlay this information with exogenous data from external sources to derive aggregated behavioral attributes of the user. In some embodiments, the video data may be received from a continuous video stream from the first user device (e.g., current phone). In other embodiments, the video data may be received from a continuous video stream from the second user device (e.g., upgraded phone). In some still further embodiments, the video data may be received from a continuous video stream from the first user device (e.g., current phone) and the second user device (e.g., upgraded phone). In some example embodiments, not mutually exclusive of those described above, the continuous authentication server may employ various video consistency thresholds in order to ensure that the same user is present (e.g., within the video stream) of both the first user device and the second user device.

Accordingly, example embodiments thus secure data migrated between user devices based upon continuous authentication of a session between a first and a second user device. Furthermore, video streams from each of the first user device and the second user device may be used in the continuous authentication of the sessions between these devices. Greater detail is provided below regarding certain example embodiments contemplated herein.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "digital content" refers to any electronic media item that is intended to be used in an electronic form and which is renderable by one or more software applications that are accessible by the apparatus (e.g., continuous authentication server 200 in FIG. 1). For example, digital content may include images, video files, text files, and the like. Digital content may be further used to include any software application, application program, mobile application, or the like. For example, a software application (e.g., digital content) may include word processors, email, calendars, shared workspaces, software development tools, project management tools, collaborative spaces, or the like. As used herein, digital content may refer to the data transferred between user devices (e.g., a first user device and a second user device) secured via the continuous authentication mechanisms described herein.

As used herein, the terms "user device," "first user device," "second user device," and the like refer to computer hardware and/or software that is configured to access a service made available by the continuous authentication server and, among various other functions, is configured to directly, or indirectly, transmit and receive at digital content. Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the continuous authentication server via Bluetooth, NFC, Wi-Fi, 3G, 4G, 5G, RFID protocols, and the like. By way of a particular example, a first user device may be a current mobile phone of a user and a second user device may be an upgraded mobile phone of the user, where each user device is equipped with a Wi-Fi radio that is configured to communicate with a Wi-Fi access point that is in communication with the server (e.g., a continuous authentication server of the present disclosure) via a network.

As used herein, the term "baseline attribute dataset" refers to a structured data set or repository for storing user attribute data (e.g., biometric data, sensor data, relationship data, or the like). By way of example, the baseline attribute dataset may store images, video data, sensor data (e.g., tilt data, acceleration data, and/or touch sensor data), landmark or nodal point data, biometric facial data, and/or behavioral attribute data associated with the first user. The data stored by the baseline attribute dataset may be inputted by a user, generated by one or more sensors or cameras, and/or may be programmatically determined by the continuous authentication server through a machine learning model. By way of example, the baseline attribute dataset may be periodically or iteratively updated, modified, and improved by the subsequently inputted or gathered user data (e.g., first attribute dataset, the second attribute dataset, etc.).

The terms "circuitry," "module," "utility," and similar terms should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, or utilities.

As used herein, the term "computer-readable medium" refers to non-transitory storage hardware, non-transitory storage device, or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a continuous authentication server 200) communicably connected with a first user device 106 and a second user device 108 via a network 104. The example system 100 may also include a baseline attribute dataset 110 in communication with the continuous authentication server 200.

The continuous authentication server 200 may include circuitry, networked processors, or the like configured to perform some or all of the apparatus-based (e.g., continuous authentication server-based) processes described herein, and may be any suitable network server and/or other type of processing device. In some embodiments, the continuous authentication server 200 may function as a "cloud" with respect to the first user device 106 and the second user device 108. In that sense, the continuous authentication server 200 may include several servers performing interconnected and/or distributed functions. To avoid unnecessarily overcomplicating the disclosure, the continuous authentication server 200 is shown and described herein as a single server.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 106 may be associated with a first user. Additional user devices (i.e., second user device 108) may be also be associated with the first user. Although two user devices are shown, the example system 100 may include any number of user devices that may be associated with various other users and/or user profiles. The first user device 106 and the second user device 108 may be cellular telephones (including smartphones and/or other types of mobile telephones), laptops, tablets, electronic readers, e-book devices, media devices, wearables, smart glasses, smartwatches, or any combination of the above.

In some embodiments, the first user device 106 and the second user device 108 may each be configured to request and/or display digital content. The user devices (e.g., first user device 106 and second user device 108) may also allow a user to input commands (such as selecting particular digital content) which may be conveyed to the continuous authentication server 200 via the network 104 as input data. Input data may be generated via one or more input devices including, without limitation, a touchscreen, a microphone, a camera, and/or a motion sensor device (e.g., an accelerometer, gyroscope, etc.).

The baseline attribute dataset 110 may be any suitable network storage device configured to store some or all of the information described herein. The baseline attribute dataset 110 may receive data from the continuous authentication server 200 (e.g., via a memory 204 and/or processor(s) 202), and may store this data. As such, the baseline attribute dataset 110 may include, for example, one or more database systems, backend data servers, network databases, cloud storage devices, etc. Furthermore, in some embodiments, the baseline attribute dataset 110 may be housed in whole or in part by the continuous authentication server 200. To avoid unnecessarily overcomplicating the disclosure, the baseline attribute dataset 110 is shown and described herein as a single database.

Apparatuses (e.g., continuous authentication server 200) of the present invention may be embodied by any of a variety of devices. For example, the continuous authentication server 200 may be configured to securely transfer/migrate digital content and continuous authenticate a session between user devices. The continuous authentication server 200 may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection with example continuous authentication server 200. It will be understood that the continuous authentication server 200 is illustrated as a single apparatus in FIG. 1 for ease of illustration. In some embodiments, one or more components of the continuous authentication server 200 may be wholly or partially housed within one or more of the first user device 106 or the second user device 108. As described above, although the baseline attribute dataset 110 is also illustrated as stand-alone elements in FIG. 1, in some embodiments the baseline attribute dataset 110 may be housed in whole or in party by the first user device 106 and/or the second user device 108.

Figure 2:
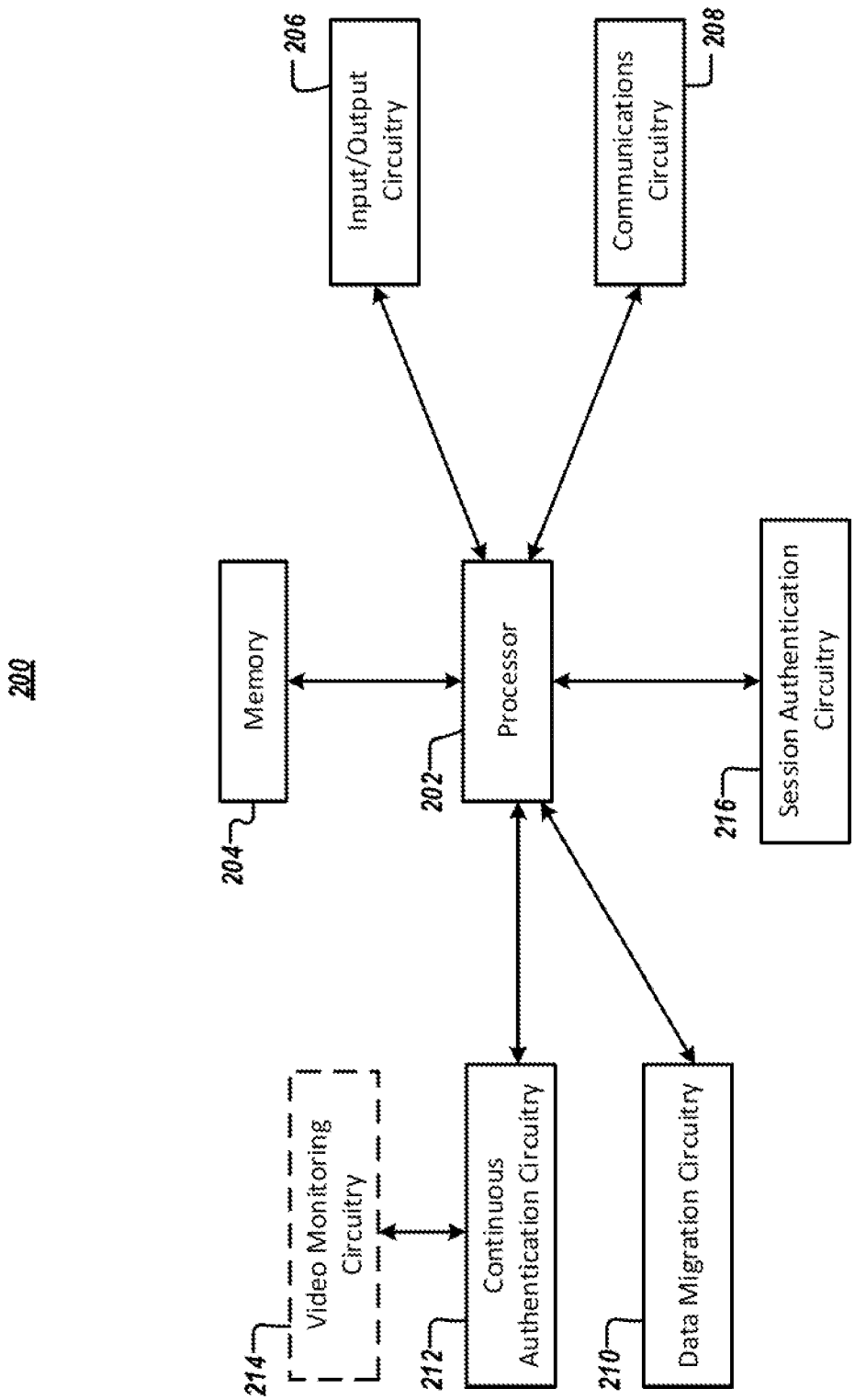
FIG. 2 illustrates a schematic block diagram of example circuitry that may perform various operations in accordance with some example embodiments described herein.

As illustrated in FIG. 2, the continuous authentication server 200 may include a processor 202, a memory 204, input/output circuitry 206, and communications circuitry 208. Moreover, the continuous authentication server 200 may include data migration circuitry 210, continuous authentication circuitry 212, session authentication circuitry 216, and, in some embodiments, video monitoring circuitry 214. The continuous authentication server 200 may be configured to execute the operations described below in connection with FIGS. 3-5. Although these components 202-216 are described in some cases using functional language, it should be understood that the particular implementations necessarily include the use of particular hardware. It should also be understood that certain of these components 202-216 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein with respect to components of the continuous authentication server therefore includes particular hardware configured to perform the functions associated with respective circuitry described herein. As described in the example above, in some embodiments, various elements or components of the circuitry of the continuous authentication server 200 may be housed within one or more of the first user device 106 or the second user device 108. As indicated previously, it will be understood in this regard that some of the components described in connection with the continuous authentication server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the continuous authentication server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the continuous authentication server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the continuous authentication server to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the continuous authentication server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The continuous authentication server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of display through computer program instructions (e.g., software and/or firmware) stored on a memory accessible to the processor (e.g., memory 204, and/or the like), such as to display secured digital objects.

The communications circuitry 208 may be any means such as a device or circuitry embodied in either hardware or a combination of hardware and software that is configured to receive and/or transmit data from/to a network and/or any other device, circuitry, or module in communication with the continuous authentication server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the continuous authentication server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Data migration circuitry 210 includes hardware components designed to cause data transfer between the first user device 106 and the second user device 108. These hardware components may, for instance, utilize elements of communications circuitry 208 to transmit (e.g., via near-field communications, Bluetooth low energy (BLE) communications, or the like) digital content from the first user device 106 to the second user device 108. Data migration circuitry 210 may utilize processing circuitry, such as the processor 202, to perform its corresponding operations, and may utilize memory 204 to store collected information.

Session authentication circuitry 216 includes hardware components designed to retrieve a baseline attribute dataset, generate a first attribute dataset, and/or authenticate a session between the first user device 106 and the second user device 108 based on the baseline and first attribute datasets. Session authentication circuitry 216 may utilize processing circuitry, such as the processor 202, to perform its corresponding operations, and may utilize memory 204 to store collected information.

Continuous authentication circuitry 212 includes hardware components designed to generate a second attribute dataset at a second time (e.g., after the first attribute dataset) and authenticate the session between the first user device 106 and the second user device 108 at the second time based on the first attribute dataset and the second attribute dataset. The continuous authentication circuitry 212 may further include, in some embodiments, video monitoring circuitry 214 for generating a video dataset. Continuous authentication circuitry 212 may utilize processing circuitry, such as the processor 202, to perform its corresponding operations, and may utilize memory 204 to store collected information.

It should also be appreciated that, in some embodiments, the data migration circuitry 210, the continuous authentication circuitry 212, the session authentication circuitry 216, or the video monitoring circuitry 214, may include a separate processor, specially configured field programmable gate array (FPGA), or application specific interface circuit (ASIC) to perform its corresponding functions.

In addition, computer program instructions and/or other type of code may be loaded onto a computer, processor or other programmable continuous authentication server's circuitry to produce a machine, such that the computer, processor other programmable circuitry that execute the code on the machine create the means for implementing the various functions, including those described in connection with the components of continuous authentication server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Securely Delivering Digital Content

Figure 3:
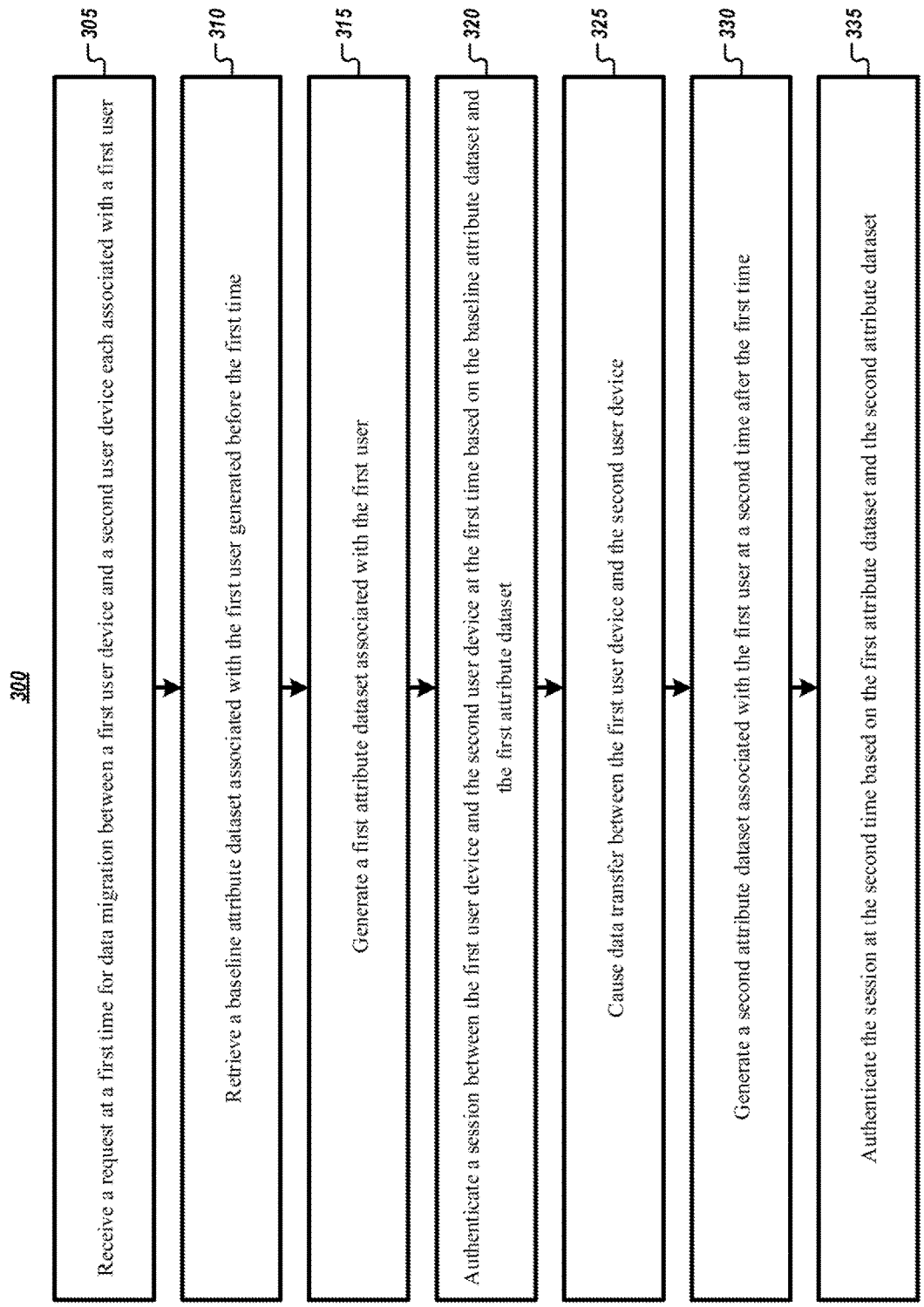
FIG. 3 illustrates an example flowchart for securely migrating data between devices in accordance with some example embodiments described herein.

Turning to FIG. 3, a flowchart is illustrated that contains operations for using an apparatus (e.g., continuous authentication server 200) to securely migrate data between user devices. The operations illustrated in FIG. 3 may, for example, be performed by the continuous authentication server 200, as described above. In this regard, the continuous authentication server 200 illustrates example components included such that the operations described herein may be performed by or through the use of one or more of processor 202, memory 204, input/output circuitry 206, communications circuitry 208, data migration circuitry 210, continuous authentication circuitry 212, video monitoring circuitry 214, or session authentication circuitry 216.

With continued reference to FIG. 3, the continuous authentication server 200 may further include means, such as the processor 202, the input/output circuitry 206, the communications circuitry 208, or the like, for receiving a request at a first time for data migration between a first user device 106 and a second user device 108 each associated with a first user at Block 305. In some embodiments, the request may be transmitted by the first user device 106 by a user inputting (e.g., via input/output circuitry of the first user device 106) a request for data migration at the first user device 106. By way of example, a user may enter a request to transfer digital content stored on the first user device 106 (e.g., current mobile phone) to the second user device 108 (e.g., a new, upgraded mobile phone). Similarly, the request may be transmitted by the second user device 108 by a user inputting (e.g., via input/output circuitry of the second user device 108) a request for data migration at the second user device 108. By way of example, a user may enter a request to transfer digital content stored on the second user device 108 (e.g., new mobile phone set up procedure) to the first user device 106 (e.g., current mobile phone). In this instance, the request at Block 305 refers to a manual user request for data transfer (e.g., digital content transfer).

In some embodiments, however, the request for data migration may be transmitted by an external device (not shown) and not associated with the first user device 106 and the second user device 108. By way of example, an external device (not shown) associated with a telecommunications entity, cellular service provider, or the like may request data migration at the first time. In particular, the first user may purchase a new phone from a cellular service provider. In response to the new mobile phone (e.g., second user device 108), a computing device of the cellular service provider (e.g., external device) may transmit a request for data migration between the first user device 106 and the second user device 108. Similarly, the first user device 106 and/or the second user device 108 may periodically or automatically request data migration at Block 305. In some embodiments, the first user device 106 and/or the second user device 108 may periodically determine that data stored by the first user device 106 is not present on the second user device 108, or vice versa. As such, either the first user device 106 or the second user device 108 may transmit a request for data migration between these user devices such that data (e.g., digital content or the like) may be stored simultaneously, in whole or in part, by the first user device 106 and the second user device 108.

The continuous authentication server 200 may further include means, such as the processor 202, the communications circuitry 208, the session authentication circuitry 216, or the like, for retrieving a baseline attribute dataset associated with the first user generated before the first time at Block 310. As described in general above, the baseline attribute data structure may be generated before the first time and/or may be associated with a previous session of the user. The baseline attribute data structure may comprise sensor data, biometric data, facial recognition data, motion data, behavioral data, user profile data, portions thereof, combinations thereof, and electronic information, datasets, and signals derived therefrom. The continuous authentication server 200 may retrieve the baseline attribute data structure from the baseline attribute dataset 110, the first user device 106, the second user device 108, or any combination thereof. In some embodiments, the baseline attribute data structure may have been generated based on a video dataset comprising a video stream captured by the first user device 106 before the first time.

The continuous authentication server 200 may further include means, such as the processor 202, the session authentication circuitry 216, or the like, for generating a first attribute dataset associated with the first user at Block 315. As hereafter with reference to FIGS. 4-5, the session authentication circuitry 216 may receive a video stream captured by the first user device 106, the second user device 108, or a combination thereof and may generate a first attribute dataset associated with the first user based upon the video stream(s). For example, the session authentication circuitry 216 may receive an image from a camera of the first user device 106 or one or more frames extracted from a video captured by the camera of the first user device 108. In some embodiments, these images/frames may include at least a portion of the first user's face. The session authentication circuitry 216 may be configured to generate a first attribute dataset based upon these images/frames. As described above with reference to the baseline attribute date, the first attribute data may similarly comprise sensor data, biometric data, facial recognition data, motion data, behavioral data, user profile data, portions thereof, combinations thereof, and electronic information, datasets, and signals derived therefrom from the first time.

The continuous authentication server 200 may further include means, such as the processor 202, the session authentication circuitry 216, or the like, for authenticating a session between the first user device 106 and the second user device 108 at the first time based on the baseline attribute dataset and the first attribute dataset at Block 320. As described above with reference to Blocks 310 and 315, the baseline attribute dataset (e.g., generated at a time before the first time) and the first attribute dataset (e.g., generated at the first time) may contain one or more similar biometric features of the first user, sensor data relevant to the first user and/or user devices, behavioral data associated with the first user, and the like. The session authentication circuitry 216 may, therefore, authenticate a session between the first user device 106 and the second user device 108 in an instance in which the first attribute dataset and the baseline attribute dataset are sufficient to verify the identity of the first user.

By way of example, session authentication circuitry 216 may compare the first attribute dataset with the baseline attribute dataset and determine a confidence factor indicative of the similarities between the datasets. Said differently, the confidence factor may refer to the session authentication circuitry's 216 confidence that, for example, biometric attributes acquired at a time prior to the first time (e.g., known valid targets) correspond to the biometric attributes acquired at the first time (e.g., first attribute dataset). For example, the confidence factor may define a 90% confidence factor that the biometric attributes are accurate (e.g., between the baseline attribute and the first attribute datasets). The session authentication circuitry 216 may then compare this confidence factor (e.g., a 90% confidence factor) with one or more confidence thresholds. In an instance in which the confidence factor (e.g., between the baseline attribute and the first attribute datasets) satisfies the confidence thresholds, the continuous authentication server 200 may authenticate a session between the first user device 106 and the second user device 108. In an instance in which the confidence factor (e.g., between the baseline attribute and the first attribute datasets) fails to satisfy the confidence thresholds, the continuous authentication server 200 may notify the user of a failure to authenticate a session between the first user device 106 and the second user device 108 and/or may request further information before authenticating a session.

In response to authenticating a session between the first user device 106 and the second user device 108 at Block 320, the continuous authentication server 200 may further include means, such as the processor 202, the input/output circuitry 206, the data migration circuitry 210, or the like, for causing data transfer between the first user device and the second user device at Block 325. As described above, the data migration between the first user device 106 and the second user device 108 may be facilitated by any wireless communication protocol via the network 114 and/or via direct communications between the first user device 106 and the second user device 108. For example, in an instance in which the second user device 108 is a new, unactivated mobile phone, the second user device 108 may not be able to access the network 114 (e.g., or any cellular network). As such, near-field communication protocols or other direct communication (e.g., wired or wireless) may facilitate data transfer between the first user device 106 and the second user device 108.

Furthermore, the present disclosure contemplates that the data transferred (e.g., data migration) between the first user device 106 and the second user device 108 may include digital content, user data, etc. of any type and/or in whole or in part. By way of example, in an instance in which the first user device 106 corresponds to a current mobile device of the first user and the second user device corresponds to a new mobile device of the first user, the data migration circuitry 210 may clone or otherwise replicate all of the data stored on the first user device 106 on the second user device 108. In some embodiments, the data on the first user device 106 may then be removed or deleted, while in other embodiments the data on the first user device 106 may remain, in whole or in part.

The continuous authentication server 200 may further include means, such as the processor 202, the continuous authentication circuitry 212, or the like, for generating a second attribute dataset associated with the first user at a second time after the first time at Block 330. As hereafter with reference to FIGS. 4-5, the continuous authentication circuitry 212 may receive a video stream captured by the first user device 106, the second user device 108, or a combination thereof and may generate a second attribute dataset associated with the first user based upon the video stream(s) at a second time after the first time. For example, the continuous authentication circuitry 212 may receive an image from a camera of the first user device 106 or one or more frames extracted from a video captured by the camera of the first user device 106. In some embodiments, these images/frames may include at least a portion of the first user's face. The continuous authentication circuitry 212 may be configured to generate a second attribute dataset based upon these images/frames. As described above with reference to the baseline attribute date and the first attribute dataset, the second attribute dataset may also comprise sensor data, biometric data, facial recognition data, motion data, behavioral data, user profile data, portions thereof, combinations thereof, and electronic information, datasets, and signals derived therefrom from the second time.

By way of continued example, during data transfer (e.g., data migration) between the first user device 106 and the second user device 108, time may elapse (e.g., from the first time to the second time) while the first user remains in view of one or more cameras of the first user device 106 and/or the second user device 108. In some embodiments, the continuous authentication circuitry 212 may require (e.g., or prompt/notify) the first user to remain visible to one or more of the cameras of the first user device 106 and the second user device 108. By way of example, each of the user devices may display (e.g., via a screen or other visual display) a notice indicating to the first user to hold (or otherwise position) each of the user devices such that a portion of the first user's face is captured by the cameras of the first user device 106 and/or the second user device 108.

The continuous authentication server 200 may further include means, such as the processor 202, the continuous authentication circuitry 212, or the like, for authenticating the session at the second time based on the first attribute dataset and the second attribute dataset at Block 335. As described above with reference to Block 320, the baseline attribute dataset (e.g., generated at a time before the first time), the first attribute dataset (e.g., generated at the first time), and the second attribute dataset (e.g., generated at the second time after the first time) may contain one or more similar biometric features of the first user, sensor data relevant to the first user and/or user devices, behavioral data associated with the first user, and the like. The continuous authentication circuitry 212 may, therefore, authenticate the session (e.g., the session previously authenticated at Block 320) between the first user device 106 and the second user device 108 in an instance in which the second attribute dataset and the first attribute dataset are sufficient to verify the identity of the first user.

By way of example, continuous authentication circuitry 212 may compare the second attribute dataset with the first attribute dataset and determine a confidence factor indicative of the similarities between the datasets. Said differently, the confidence factor may refer to the continuous authentication circuitry's 212 confidence that biometric attributes, for example, acquired at the first time (e.g., previously authenticated features) correspond to the biometric attributes acquired at the second time (e.g., second attribute dataset). For example, the confidence factor may define an 85% confidence factor that the biometric attributes are accurate (e.g., between the first attribute and the second attribute datasets). The continuous authentication circuitry 212 may then compare this confidence factor (e.g., an 85% confidence factor) with one or more confidence thresholds. In an instance in which the confidence factor (e.g., between the first attribute and the second attribute datasets) satisfies the confidence thresholds, the continuous authentication server 200 may maintain the authenticated session between the first user device 106 and the second user device 108. In an instance in which the confidence factor (e.g., between the first attribute and the second attribute datasets) fails to satisfy the confidence thresholds, the continuous authentication server 200 may halt data transfer as described hereafter with reference to FIG. 5.

While described herein with reference to comparison between the second attribute dataset and the first attribute dataset, the present disclosure contemplates that any of the attribute datasets described herein may be compared with any other attribute dataset, alone or in combination. Said differently, the continuous authentication circuitry 212 may, in some embodiments, compare the second attribute dataset (e.g., generated at the second time after the first time) with the baseline attribute dataset (e.g., generated prior to the first time). As would be evident to one of ordinary skill in the art in light of the present disclosure, the continuous authentication circuitry 212 may iteratively generate attribute datasets at any time after the first time. As such, the continuous authentication circuitry 212 may compare any number of attribute datasets generated at any time so as to continuously authenticate the session between the first user device 106 and the second user device 108.

Figure 4:
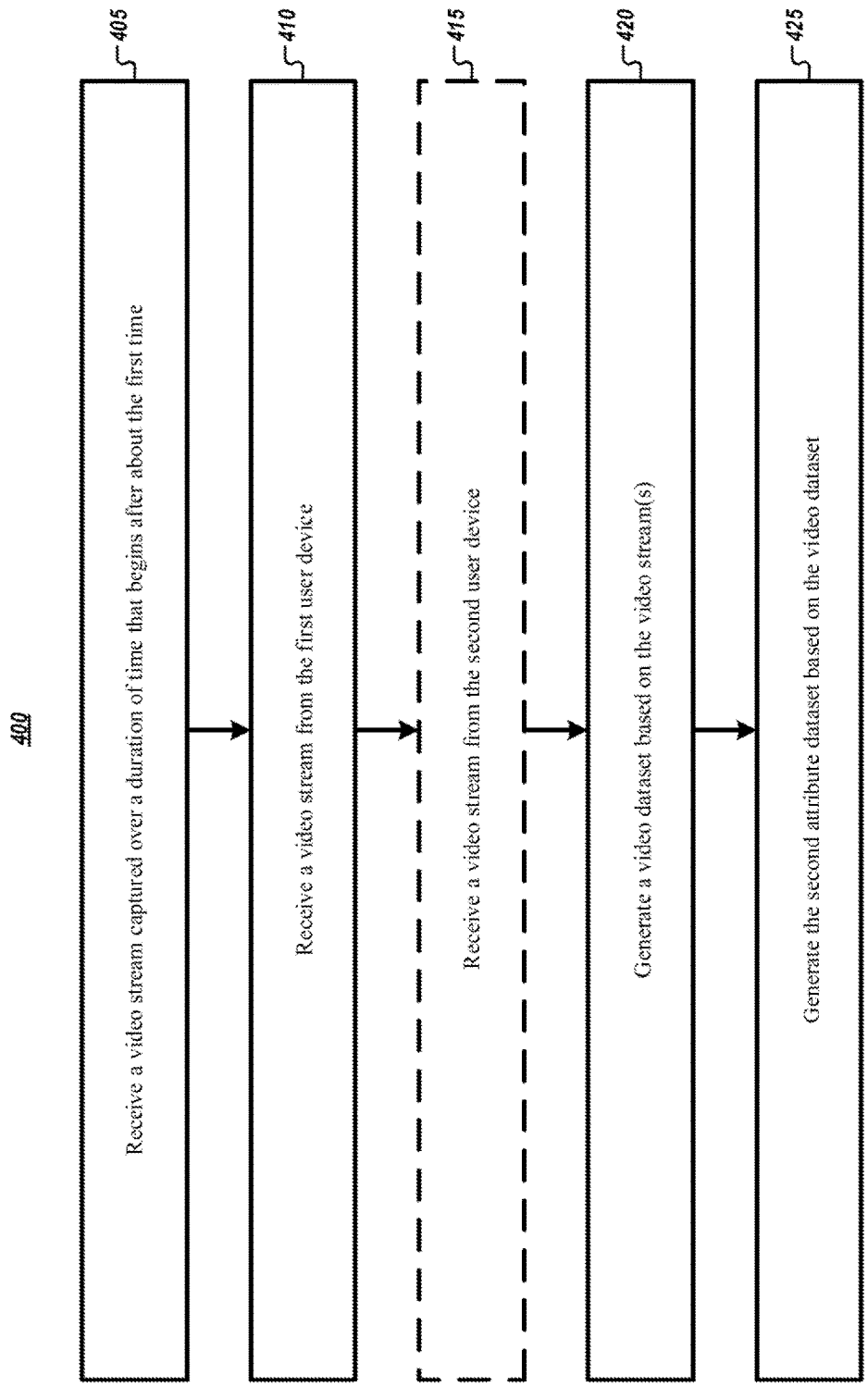
FIG. 4 illustrates an example flowchart for employing video monitoring in continuous authentication in accordance with some example embodiments described herein.

With reference to FIG. 4, an example flowchart for employing video monitoring in continuous authentication is illustrated. In some embodiments, the continuous authentication server 200 may further include means, such as the processor 202, the input/output circuitry 206, the video monitoring circuitry 214, or the like, for receiving a video stream captured over a duration of time that begins after about the first time at Block 405. As described in detail above, the continuous authentication circuitry 212 may, in some embodiments, include video monitoring circuitry 214. In any of the embodiment described herein, the video monitoring circuitry 214 may be configured to receive a video stream (e.g., from any number of sources) at Block 405.

In such an embodiment, as illustrated in FIG. 4, the video monitoring circuitry 214 may include hardware components designed or configured to request, receive, process, generate, and transmit data, datasets, control signals, and electronic information relating to electronic video. For example, the video monitoring circuitry 214 may comprise, or be in communication with, one or more imaging sensors such as photodetectors, photodiodes, cameras, or any other suitable devices or optoelectronic components (e.g., such as those defined by the first user device 106 and/or the second user device 108). These hardware components may, for instance, utilize processing circuitry 202 to perform various computing operations and may utilize memory 204 for storage of video datasets, video streams, video frames, samples, blocks, macroblocks, slices, CTUs, CTBs, coding units, coding blocks, residuals, or other electronic information received or generated by the video monitoring circuitry 214. In some embodiments, the video monitoring circuitry 214 may be configured to generate a video data structure (described hereafter at Block 420) based on an intermittent monitoring of the portion of the face of the user (e.g., from the first user device 106 and/or the second user device 108) or based on a continuous monitoring of the face of the user.

In some embodiments, the video monitoring circuitry 214 may be configured to generate a video stream capture control signal indicative of an instruction for a user device (e.g., first user device 106 and/or second user device 108) to capture the video stream over the duration of time and transmit the video stream capture control signal to the user device. The user device may receive (e.g., first user device 106 and/or second user device 108), from the video monitoring circuitry 214, the video stream capture control signal and, in response to receipt of the video stream capture control signal, capture the video stream over the duration of time as described herein.

As illustrated, in some embodiments, the continuous authentication server 200 may receive the video stream from the first user device 106 at Block 410. By way of continued example, the first user device 106 may define or otherwise be operably coupled with a video camera configured to capture images and/or a continuous video stream. Once the session authentication circuitry 216 initially authenticates a session between the first user device 106 and the second user device 108 as described with reference to FIG. 3, the video monitoring circuitry 214 may be configured to instruct the first user device 106 to begin capturing a video stream comprising a plurality of video frames over a duration of time that begins after about the first time (e.g., during data migration). The video monitoring circuitry, may receive the video stream from the first user device 106 at Block 410 and may use the video stream to generate a video dataset at Block 420.

In some alternative embodiments, the continuous authentication server 200 may receive the video stream from the second user device 108 at Block 415. In some embodiments, as described with reference to FIG. 5, the video stream from the second user device 108 may be in addition to the video stream from the first user device 106. As described above with reference to Block 410, the second user device 108 may define or otherwise be operably coupled with a video camera configured to capture images and/or a continuous video stream. Once the session authentication circuitry 216 initially authenticates a session between the first user device 106 and the second user device 108 as described with reference to FIG. 3, the video monitoring circuitry may be configured to instruct the second user device 108 to begin capturing a video stream comprising a plurality of video frames over a duration of time that begins after about the first time (e.g., during data migration). The video monitoring circuitry, may receive the video stream from the second user device 108 at Block 415 and may use the video stream to generate a video dataset at Block 420.

The continuous authentication server 200 may further include means, such as the processor 202, the video monitoring circuitry 214, or the like, for generating a video dataset based on the video stream(s) at Block 420 and generating the second attribute dataset based on the video dataset at Block 425. As described above, the continuous video stream captured by the first user device 106 and/or the second user device 108 may be used to generate a video dataset that includes various attribute data (e.g., biometric data, facial region data, facial region-by-region motion data, sensor data, and other suitable data) generated, on a frame by frame basis, from the video streams. This video dataset may be used, in whole or in part, to generate the second attribute dataset for authenticating the session between the first user device 106 and the second user device 108 as described above with reference to FIG. 3 at Block 335.

Figure 5:
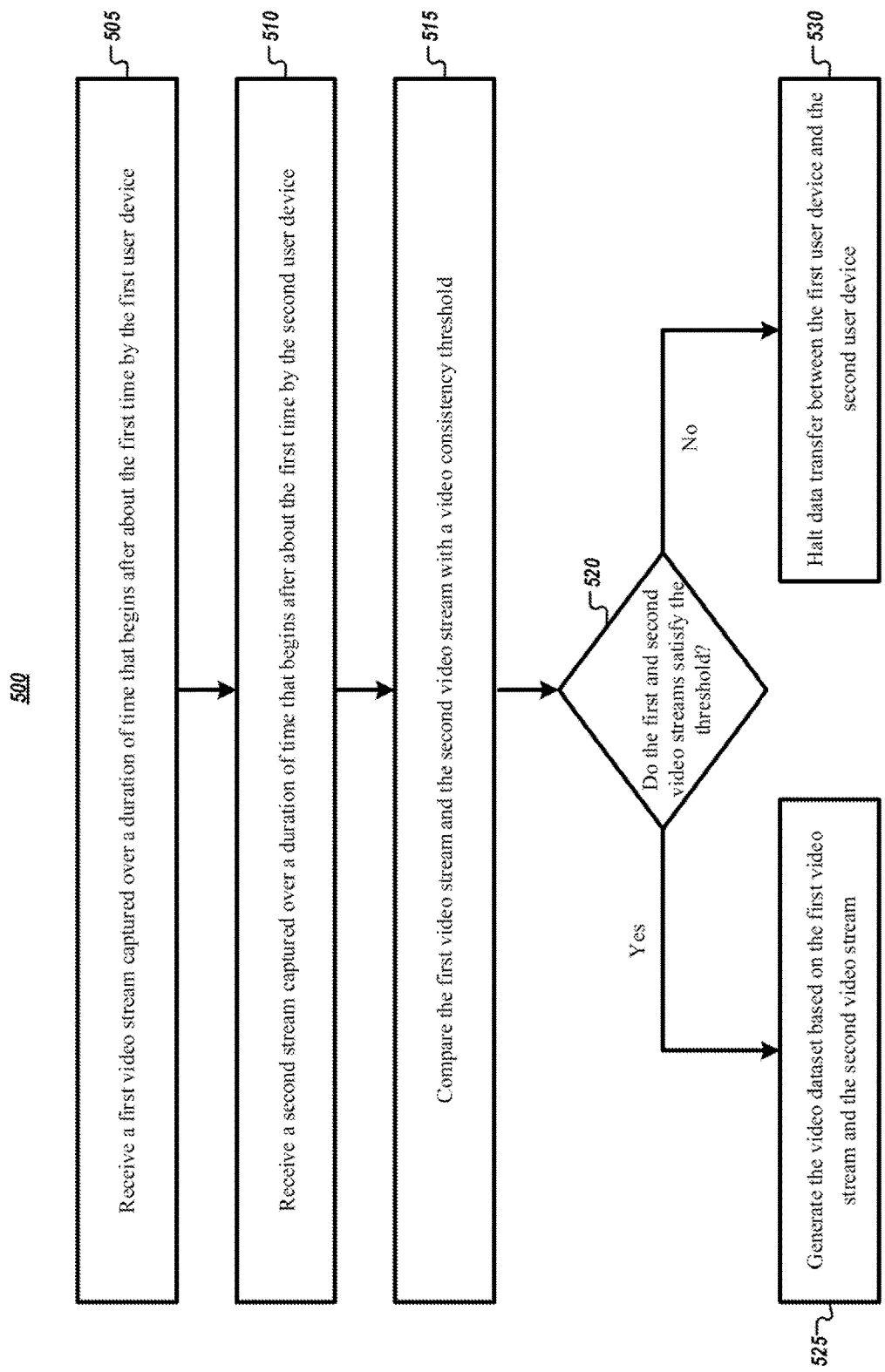
FIG. 5 illustrates an example flowchart for video consistency thresholds accordance with some example embodiments described herein.

With reference to FIG. 5, an example flowchart for video consistency thresholds is illustrated. In some embodiments, the continuous authentication server 200 may be configured to receive multiple video streams from multiple user devices during data transfer so as to further improve the security of the session between user devices.

With continued reference to FIG. 5, the continuous authentication server 200 may further include means, such as the processor 202, the input/output circuitry 206, the continuous authentication circuitry 212, the video monitoring circuitry 214, or the like, for receiving a first video stream captured over a duration of time that begins after about the first time by the first user device 106 at Block 505 and receiving a second stream captured over a duration of time that begins after about the first time by the second user device 108 at Block 510. As described above, each of the first user device 106 and the second user device 108 may define or otherwise be operably coupled to video camera devices. As such, in some embodiments, each of the first user device 106 and the second user device 108 may simultaneously capture video streams of the first user during data transfer.

The continuous authentication server 200 may further include means, such as the processor 202, the continuous authentication circuitry 212, the video monitoring circuitry 214, or the like, for comparing the first video stream and the second video stream with a video consistency threshold at Block 515 and determining if the first video stream and the second video stream satisfy the video consistency threshold at Block 520. As would be evident to ordinary skill in the art in light of the present disclosure, the first user device 106 and the second user device 108 may not occupy the same position at the same time during data transfer (e.g., data migration). As such, discrepancies between the first video stream and the second video stream may be inherent due to the relative positional differences between the devices. Furthermore, in some instances, a time delay may exist between the first video stream and the second video stream (e.g., due to difference in camera types, shutter speed, aperture, etc.). At Blocks 515 and 520, the video monitoring circuitry 214 may compare the first video stream and the second video stream and account for any positional differences necessitated by differences between the first user device 106 and the second user device 108.

As described above with reference to the confidence factor calculation above, the video consistency threshold of Block 515 may similarly operate to determine if the first video stream is consistent with the second video stream. By way of example, the video monitoring circuitry 216 may compare the first video stream with the second video stream and determine a consistency factor indicative of the similarities between the video streams. Said differently, the consistency factor may refer to the video monitoring circuitry's 214 confidence that the first video stream corresponds to (e.g., captured substantially the same video stream) the second video stream. For example, the consistency factor may define a 95% consistency factor that the video streams captured substantially equivalent video frames. The video monitoring circuitry 214 may then compare this consistency factor (e.g., a 95% confidence factor) with the video consistency threshold.

In an instance in which the first video stream and the second video stream satisfy the video consistency threshold, the continuous authentication server 200 may further include means, such as the processor 202, the continuous authentication circuitry 212, the video monitoring circuitry 214, or the like, for generating the video dataset based on the first video stream and the second video stream at Block 525. As described with reference to FIG. 4, the video dataset may be used, in whole or in part, to generate the second attribute dataset for authenticating the session between the first user device 106 and the second user device 108 as described above with reference to FIG. 3 at Block 335.

In an instance in which the first video stream and the second video stream fail to satisfy the video consistency threshold, the continuous authentication server 200 may further include means, such as the processor 202, the continuous authentication circuitry 212, the data migration circuitry 210, or the like, for halting data transfer between the first user device 106 and the second user device 108 at Block 530. By way of example, once the session between the first user device 106 and the second user device 108 is authenticated (e.g., as described with reference to FIG. 3), the first user device 106 and/or the second user device 108 may be stolen or otherwise compromised. By way of a more particular example, during data migration, the image of another user may be captured by the second user device 108 (e.g., the second video stream) while the first user associated with the second user device 108 is not present. This may indicate to the continuous authentication server 200 that the second user device 108 is compromised given that the first user is present in the images of the first video stream but not in the images of the second video stream. In such an instance, the first and the second video streams may fail to satisfy the video consistency threshold and the data migration circuitry 210 may halt data transfer between the first user device 106 and the second user device 108.

As illustrated by the example embodiments above, the technical challenges regarding secure migration of data to user devices are herein achieved by the continuous authentication mechanisms of the present invention. The example implementations of the present invention provide new methods for providing continuous security once a session is established and ensuring that data is transferred only between devices associated with the same user.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated drawings. Although the drawings only show certain components of the apparatuses and systems described herein, it is understood that various other components may be used in conjunction with the apparatuses and systems described herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for securely migrating data between devices, the method comprising:
   receiving a request at a first time for data migration between a first user device and a second user device each associated with a first user;
   authenticating, by session authentication circuitry, a session between the first user device and the second user device at the first time;

causing, by data migration circuitry, data transfer between the first user device and the second user device;

receiving, by video monitoring circuitry in communication with the continuous authentication circuitry, a video stream captured over a duration of time that begins after the first time, wherein the video stream comprises a plurality of video frames;

generating, by continuous authentication circuitry and in response to receiving the video stream, a second attribute dataset associated with the first user at a second time after the first time, wherein generating the second attribute dataset comprises:

generating, by the video monitoring circuitry, a video dataset based on the video stream, wherein the second attribute dataset comprises the video dataset; and re-authenticating, by the continuous authentication circuitry, the session based on the second attribute dataset.

2. The method according to claim 1, wherein the video stream comprises a face of the first user.

3. The method according to claim 1, wherein the video stream is received from the first user device.

4. The method according to claim 1, wherein generating the second attribute dataset further comprises:

receiving, by video monitoring circuitry in communication with the continuous authentication circuitry, a first video stream captured by the first user device over a duration of time that begins after the first time, wherein the first video stream comprises a plurality of video frames, wherein the video stream is a second video stream captured by the second user device.

5. The method according to claim 4, wherein each of the first video stream and the second video stream comprise a face of the first user.

6. The method according to claim 4, further comprising:

comparing, by the video monitoring circuitry, the first video stream and the second video stream with a video consistency threshold; and in an instance in which the first video stream and the second video stream satisfy the video consistency threshold, generating, by the video monitoring circuitry, the second attribute dataset based on the first video stream and the second video stream.

7. The method according to claim 4, further comprising:

comparing, by the video monitoring circuitry, the first video stream and the second video stream with a video consistency threshold; and in an instance in which the first video stream and the second video stream fail to satisfy the video consistency threshold, halting, by the data migration circuitry, data transfer between the first user device and the second user device.

8. The method according to claim 1, wherein the request at the first time for data migration between the first user device and the second user device is received from an external device, wherein the external device is not associated with the first user.

9. The method according to claim 1, wherein generating the video dataset comprises:

generating, by the video monitoring circuitry, a video stream capture control signal, wherein the video stream capture control signal is indicative of an instruction to capture the video stream over the duration of time; and transmitting, by the video monitoring circuitry, the video stream capture control signal to the first user device or second user device.

10. An apparatus for securely migrating data between devices, the apparatus comprising:

communications circuitry configured to receive a request at a first time for data migration between a first user device and a second user device each associated with a first user;

session authentication circuitry configured to authenticate a session between the first user device and the second user device at the first time;

data migration circuitry configured to cause data transfer between the first user device and the second user device; and video monitoring circuitry in communication with continuous authentication circuitry configured to receive a video stream captured over a duration of time that begins after the first time, wherein the video stream comprises a plurality of video frames;

the continuous authentication circuitry configured to generate, in response to receiving the video stream, a second attribute dataset associated with the first user at a second time after the first time, wherein the video monitoring circuitry further configured to:

generate a video data set based on the video stream, wherein the attribute dataset comprises the video dataset; and the continuous authentication circuitry further configured to re-authenticate the session.

11. The apparatus according to claim 10, wherein the video stream comprises a face of the first user.

12. The apparatus according to claim 10, wherein the video stream is received from the first user device.

13. The apparatus according to claim 10, wherein the video monitoring circuitry in communication with the continuous authentication circuitry if further configured to:

receive a first video stream captured by the first user device over a duration of time that begins after the first time, wherein the first video stream comprises a plurality of video frames, wherein the video stream is a second video stream captured by the second user device.

14. The apparatus according to claim 13, wherein each of the first video stream and the second video stream comprise a face of the first user.

15. The apparatus according to claim 13, wherein the video monitoring circuitry is further configured to:

compare the first video stream and the second video stream with a video consistency threshold; and in an instance in which the first video stream and the second video stream satisfy the video consistency threshold, generate the second attribute dataset based on the first video stream and the second video stream.

16. The apparatus according to claim 13, wherein the video monitoring circuitry is further configured to compare the first video stream and the second video stream with a video consistency threshold; and in an instance in which the first video stream and the second video stream fail to satisfy the video consistency threshold, the data migration circuitry is configured to halt data transfer between the first user device and the second user device.

17. The apparatus according to claim 10, wherein the request at the first time for data migration between the first user device and the second user device is received from an external device, wherein the external device is not associated with the first user.

18. The apparatus according to claim 10, wherein the video monitoring circuitry is further configured to:

generate a video stream capture control signal, wherein the video stream capture control signal is indicative of an instruction to capture the video stream over the duration of time; and transmit the video stream capture control signal to the first user device or second user device.

19. A non-transitory computer-readable storage medium for using an apparatus to securely migrate data between devices, the non-transitory computer-readable storage medium storing instructions that, when executed, cause the apparatus to:

receive a request at a first time for data migration between a first user device and a second user device each associated with a first user;

authenticate a session between the first user device and the second user device at the first time;

cause data transfer between the first user device and the second user device;

receive a video stream captured over a duration of time that begins after the first time, wherein the video stream comprises a plurality of video frames;

generate, in response to receiving the video stream, a second attribute dataset associated with the first user at a second time after the first time, wherein generating the second attribute dataset comprises:

generating a video dataset based on the video stream, wherein the second attribute dataset comprises the video dataset; and re-authenticate the session based on the second attribute dataset.

20. The non-transitory computer-readable storage medium according to claim 19, wherein the request at the first time for data migration between the first user device and the second user device is received from an external device, wherein the external device is not associated with the first user.

* * * * *